United States Patent [19]

Holroyd et al.

[11] 4,409,059
[45] Oct. 11, 1983

[54] REINFORCED STRUCTURES

[75] Inventors: Eric Holroyd, Knutsford; David J. B. Perkins, Liverpool, both of England

[73] Assignee: W & A Bates Limited, London, England

[21] Appl. No.: 310,394

[22] Filed: Oct. 9, 1981

[30] Foreign Application Priority Data

Oct. 16, 1980 [GB] United Kingdom ............... 8033331

[51] Int. Cl.³ .................. B29H 17/04; B29H 9/04; D04H 3/05
[52] U.S. Cl. .................................. 156/397; 156/117; 156/181; 156/405.1; 156/439; 28/102; 152/359; 152/361 R
[58] Field of Search ................ 156/110 R, 117, 181, 156/397, 405 P, 439–440, 405.1; 28/101–102; 152/354–356, 357–359, 361

[56] References Cited

U.S. PATENT DOCUMENTS

| 662,963 | 12/1900 | Preston et al. | 152/356 |
| 3,607,565 | 9/1971 | Eaton | 156/440 |
| 3,972,767 | 8/1976 | Frazier | 156/397 |
| 4,249,981 | 2/1981 | Pelletier et al. | 156/441 |

FOREIGN PATENT DOCUMENTS 848962 9/1960 United Kingdom ............... 156/117

Primary Examiner—Edward C. Kimlin
Assistant Examiner—Lois E. Boland
Attorney, Agent, or Firm—Stevens, Davis, Miller & Mosher

[57] ABSTRACT

Apparatus for manufacturing tire breaker fabric comprising a cord feed unit, guide means for guiding a single cord between two sets of retaining means attached one to either edge of an endless belt to form an elongate sheet of parallel closely spaced cords laid in zig-zag fashion such that the edges of the sheet are formed by a series of folded cord edges which are held by the retaining means. Stepwise drive means advances the belt and cord assembly to elastomer applying means for applying elastomer to one surface of the cord assembly.

19 Claims, 4 Drawing Figures

REINFORCED STRUCTURES

This invention relates to reinforced structures and in particular to apparatus for manufacturing tire tread reinforcement fabric, often known as breaker fabric and to the method of operating said apparatus.

It relates more specifically to a special type of breaker fabric as described in assignee's co-pending U.S. patent application Ser. No. 283,039 filed July 13, 1981. The breaker fabric there described comprises an elongate sheet of tire cord embedded in rubber, the elongate sheet having edges spaced apart by the width of the breaker ply for which said fabric is intended wherein at least in the edge regions, the tire cord is all in a single plane such that the sheet in said regions is only one cord diameter thick, the cords extending across the sheet to the sheet edges and each portion of each cord at said edge is folded on itself about an axis perpendicular to the plane of the sheet such that the edges of the sheet are formed by a series of folded cord edges. The cords are all formed by a single continuous cord which extends back and forth across the sheet being folded back on itself at each edge in turn.

It is important in tire breaker fabric that the cords are very consistently and accurately positioned and an object of the present invention is to provide an apparatus for assembling tire breaker fabric of the required consistency.

According to the present invention an apparatus for making tire breaker fabric comprises a tire cord feeding unit, a fabric assembly platform comprising an endless belt having stepwise drive means to move the belt in the direction of its length, guide means for guiding the cord from side-to-side of the assembly platform to form a continuous elongate cord assembly the edges of which are formed by respective series of longitudinally spaced folded cord edges, two sets of retaining means attached one set to either edge of the belt and arranged to hold the folded cord edges of the cord assembly and elastomer applying means to apply elastomer to one surface of the cord assembly.

Preferably the guide means comprises two cord shaping arms which move alternately to feed the cord across the belt between the sets of retaining means. Each arm is preferably pivotally mounted about a respective axis perpendicular to the plane of the belt surface. Each arm is preferably pivotally mounted at or near to one end thereof and the other end is provided with a cord engaging surface profiled to impart a fold to the cord. Preferably each arm is pivotally mounted adjacent to a respective one edge of the belt and is operable to feed the cord to the set of retaining means attached to the opposite edge of the belt. The cord feeding unit may be mounted at one edge of the belt or above it.

The endless belt may comprise a single belt of appropriate width between the sets of retaining means corresponding to the required breaker fabric width but preferably comprises two belt sections arranged side-by-side one another and adjuster means is provided to allow the spacing between the belt sections to be adjusted for producing different breaker fabric widths.

Each retaining means conveniently comprises a series of longitudinally spaced apart wrapping pegs positioned for forming a longitudinal edge of the cord assembly and each folded cord edge is positioned by wrapping around a peg. Preferably each retaining means further includes clip means to position each folded cord edge around its peg and to consolidate the fold.

Each clip means may comprise a plurality of clips which remain on the associated pegs until the elastomer material is applied to consolidate the cord assembly. More preferably each clip means comprises a single clip which positions and consolidates each folded cord edge around its peg and is then released and indexed onto the next peg in turn.

The elastomer applying means preferably comprises a roller mounted on one side of the endless belt to friction rubber sheet into the adjacent surface of the cord assembly.

Further aspects of the invention will be apparent from the following description, given by way of example only, of some embodiments of the invention in conjunction with the attached diagrammatic drawings in which.

Figure 1:
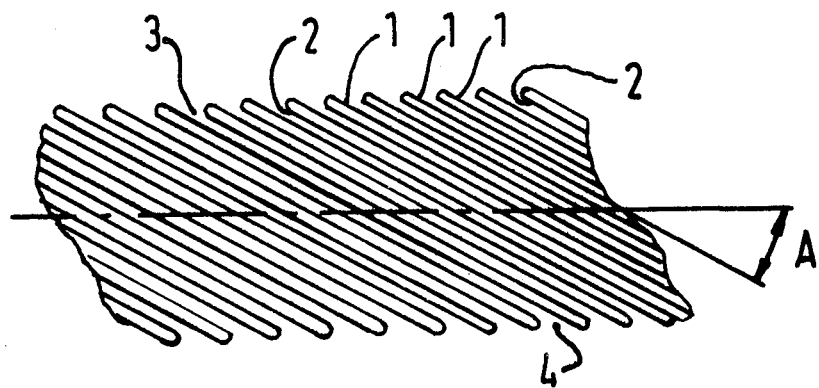
FIG. 1 is a plan view of a short length of breaker fabric.
Figure 2:
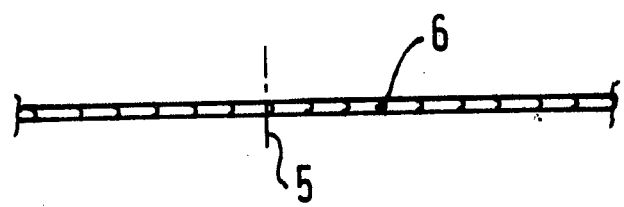
FIG. 2 is a side view of the fabric of FIG. 1.

The breaker fabric shown in FIGS. 1 and 2 comprises an elongate sheet of fabric having parallel, closely-spaced steel wire reinforcement cords 1 and 2 laid at an acute angle A of 21° to the longitudinal centreline of the elongated sheet. The parallel cord assembly is formed from a single cord laid in zig-zag fashion such that the cords marked 1 when they reach the edge 3 of the sheet are folded back on themselves and follow the cord path marked 2. Similarly at the other edge 4 of the sheet the cords marked 2 are folded back on themselves and follow the cord path marked 1. The cord assembly thus formed has a looped edge construction.

FIG. 2 shows the axis 5 of the fold between adjacent cords 1 and 2 to be perpendicular to the main surface areas of the sheet. Thus the cord assembly at the edge regions of the sheet is only substantially one cord in thickness. The cords are held in the assembled positions by means of unvulcanized rubber compound 6 which is frictioned into the cord assembly.

The resultant tire cord fabric sheet is the required width for use in tire building, the cords are at the required bias angle, no cut cord ends exist at the fabric edges and the fabric sheet has a substantially uniform thickness which provides further freedom in tyre design and building methods.

Figure 3:
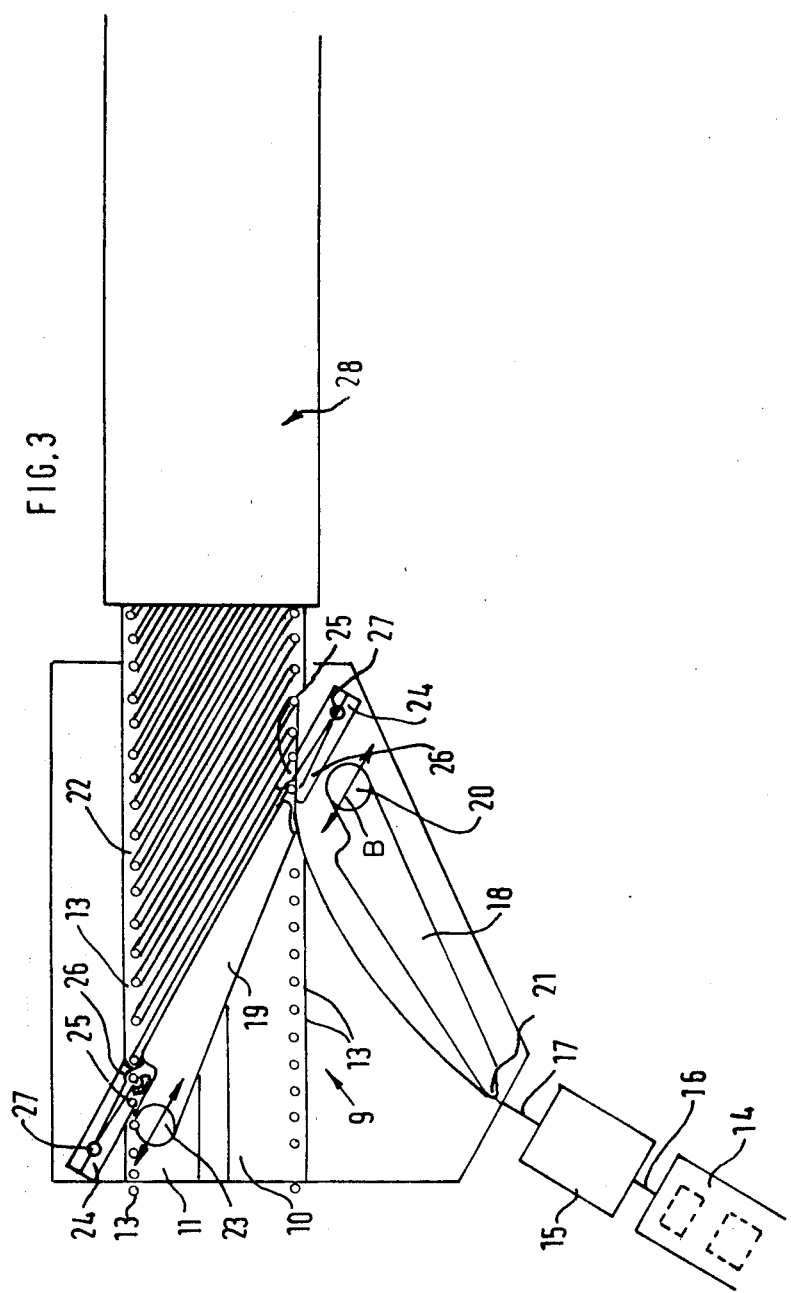
FIG. 3 is a plan view of a fabric assembly machine according to the present invention.
Figure 4:
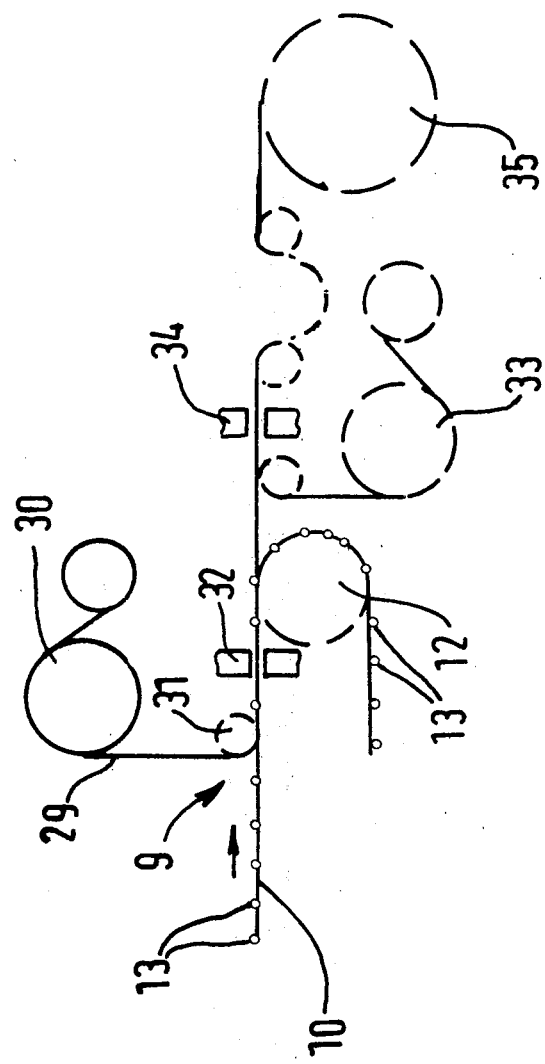
FIG. 4 is a side view of part of the machine of FIG. 3.

The apparatus for assembling the breaker fabric shown in FIGS. 1 and 2 is illustrated in FIGS. 3 and 4 and comprises a building or assembly table 9 formed by a pair of endless belt sections 10 and 11 arranged side-by-side one another. The belt sections 10 and 11 run on conventional belt end rollers, one of which 12 is shown in FIG. 4, and the spacing between the belt sections is adjustable, by means not shown, so that different widths of breaker fabric may be assembled on a single machine.

A series of longitudinally spaced wrapping pegs 13 is provided along the outer edge of each belt section 10 and 11. Each wrapping peg 3 projects a short distance from the belt surface.

The drive rollers for the belt sections 10 and 11 are synchronized and are additionally provided with an incremental drive system which allows the belts to be advanced step-wise by half the distance between successive wrapping pegs 13.

A steel cord tensioned let-off unit 14 is positioned to one side of the assembly table 9 and a cord feeder unit 15 takes the cord 16 and drives it towards the assembly table as required. Control means for the feeder unit 15 is provided so that the feed rate can be closely controlled to suit the fabric formation demand for cord.

The driven cord 17 passes to the surface of the assembly table and is laid in the required zig-zag configuration by a pair of cord shaping arms 18 and 19. The first arm 18 is pivotal about an axis 20, which is perpendicular to the assembly table 9 and positioned to the outside of the wrapping pegs 13 associated with belt section 10 whereby the arm 18 is movable between the position shown in FIG. 3 to a position parallel to previously laid cords 22 to feed the driven cord 17 to the wrapping peg 13 associated with belt section 11. Means is provided to adjust the vertical position of the arm 18 relative to the assembly table surface 9 so that its return sweep is raised relative to its feed sweep. The arm 18 has a shaped outer tip 21 for engagement with the driven cord 17 during its feed sweep. The pivot axis 20 of the shaping arm 18 is movable in the direction shown with arrows.

The second arm 19 is similar to the arm 18 described above except that its pivot axis 23 is positioned a small distance inside the wrapping pegs 13 associated with the belt section 11.

A respective cord clip 24 is provided on the outer edge of each belt section 10 and 11 adjacent to the pivot axes of the arms 18 and 19. Each clip is similar and comprises a pair of closable jaws 25 and 26 shaped to fit around a wrapping peg 13, a pivot axis 27 for the jaws, drive means for closing the jaws, and drive means to raise the clip 24 from an operative position around a wrapping peg 13 to a standby position clear of the peg 13.

The second stage of the machine indicated by reference number 28 in FIG. 3 and shown in more detail in FIG. 4 comprises a rubber frictioning unit of basically conventional form. A first unvulcanized rubber sheet 29 is supplied to the upper surface of the cord assembly on the table 9 by a first supply unit 30, and this rubber sheet 29 is rolled or frictioned into place by a roller 21 and consolidated by a first press unit 32 having a fixed platen below the belt sections 10 and 11 and a movable platen above the belt sections 10 and 11. Downstream of the press unit 32 the fabric sheet is stripped from the belt sections 10 and 11 and a second unvulcanized rubber sheet supplied to the lower surface of the fabric sheet by a second supply unit 33. The second sheet is rolled or frictioned into place by a roller and the fabric sheet consolidated by a final consolidating press unit 34 whereupon the fabric sheet is collected by a batch and haul-off unit 35.

The machine operates as follows:

Starting from the position shown in FIG. 3, a length of cord 17 fed from the feeder unit 15 towards the assembly table 9 is engaged by the tip 21 of the arm 18 which is in its lower position for commencing a feed sweep. The arm 19 having completed a feed sweep is raised and swung outwards (return sweep) to the edge of belt section 11. The arm 18 is simultaneously swung inwards (feed sweep) to a position parallel to the previously laid cords 22 thereby taking the cord 17 across the assembly table to the next free wrapping peg 13 on the opposite belt section 11. The tip 21 and the cord tension cause the cord 17 to fold around the radius of the tip 21 during the feed sweep and the folded cord edge is positioned between the open jaws of the cord clip 24 adjacent to the outer edge of belt section 11. This positioning of the folded edge is assisted by the pivot axis 20 of the arm 18 being moved in the direction of the arrow B towards the cord clip 24 during the feed sweep. The cord clip 24 holds the folded edge and is lowered to position the folded edge around the wrapping peg 13 whereupon the jaws are closed to consolidate the fold. Meanwhile the arm 18 is raised from the table 9 away from the cord assembly being formed and the other arm 19 and the other cord clip 24 are lowered and raised respectively.

The tip of the arm 19 then engages a second fed length of cord 17 and the arm is swung inwards (feed sweep) to a position parallel to previously laid cords 22 thereby taking the cord 17 back across the assembly table 9 to the next free wrapping peg on belt section 10 where it is positioned around the peg by a similar process to that described above. Simultaneously the arm 18 is swung outwards (return sweep) to the edge of the belt section 10 and lowered to its initial position ready to lead the next cord length across the table.

As soon as each measured length of cord is laid and consolidated around a wrapping peg 13 the associated clip 24 is opened and raised above the peg whereupon the belt sections 10 and 11 are indexed forward one step ready for laying the next traverse of cord.

The zig-zag cord assembly 22 thus formed and held in the assembled form by the wrapping pegs 13 is passed through the first rubber frictioning unit where the unvulcanized rubber sheet 29 is applied to the upper surface of the cord assembly.

The belt sections 10 and 11 are then removed from the fabric sheet thus formed thereby disengaging the wrapping pegs 13 from the folded cord edges. The second frictioning unit applies a further sheet of unvulcanized rubber, and the sheet of tire breaker fabric is then batched up.

It will be understood that the invention is not restricted to the above-described apparatus which may be modified in a number of ways. For example the guide means for guiding the driven cord back and forth across the assembly table may comprise a single arm positioned above the table and pivotal about an axis normal to the plane of the table surface for guiding successive lengths of fed cord to opposite edges of the table. Alternatively the guide means may comprise a cord carrier mounted for reciprocating movement on a carriage extending transversely of the table.

Having now described my invention—what I claim is:

1. Apparatus for making a tire breaker fabric comprising an elongate sheet of tire cord fabric embedded in elastomer in which the cords extending across the sheet are formed by one single continuous tire cord which extends back and forth across the sheet so that the edges of the sheet are formed by a series of folded cord edges, the apparatus comprising:
   (a) a pair of parallel spaced-apart retaining means;
   (b) each retaining means comprising a plurality of longitudinally spaced fixed pegs attached to endless belt means;
   (c) a feed unit for one single continuous tire cord;
   (d) guide means for guiding said tire cord to and fro between said retaining means;
   (e) said guide means being shaped to impart a fold to the tire cord at each retaining means to form a continuous elongate cord assembly the edges of which are formed by a series of folded cord edges;

(f) respective clip means associated with each retaining means to receive and transfer each folded cord edge to a respective peg of the associated retaining means;

(g) stepwise drive means to move said endless belt means in the direction of its length;

(h) means for applying elastomer to said cord assembly to produce tire breaker fabric; and (i) means for removing said retaining means from said tire breaker fabric.

2. Apparatus according to claim 1 wherein said guide means comprises at least one arm mounted for pivotal movement about an axis perpendicular to the plane of the belt surface.

3. Apparatus according to claim 2 wherein said guide means comprises a pair of arms.

4. Apparatus according to claim 3 wherein each arm is pivotally mounted at or near to one end thereof and the other end defines a cord engaging surface.

5. Apparatus according to claim 3 wherein each arm is pivotally mounted adjacent to a respective one edge of said belt.

6. Apparatus according to claim 5 wherein each arm is pivotal to feed said cord across said assembly table to the set of retaining means attached to the opposite edge of said belt.

7. Apparatus according to claim 3 wherein each arm is movable in a direction perpendicular to the belt surface.

8. Apparatus according to claim 3 wherein the pivot axis of each arm is movable in a direction parallel to the belt surface.

9. Apparatus according to claim 1 wherein said endless belt means comprises two belt sections arranged side-by-side, each belt section having an associated set of retaining means attached thereto.

10. Apparatus according to claim 9 including means for adjusting the spacing between said belt sections.

11. Apparatus according to claim 1 wherein each clip means comprises a plurality of clips for retaining a folded cord edge on the associated peg until said elastomer material is applied.

12. Apparatus according to claim 1 wherein each clip means comprises a single clip which positions each folded cord edge around its peg.

13. Apparatus according to claim 12 wherein each clip is movable in a direction perpendicular to the belt surface.

14. Apparatus according to claim 12 wherein each clip comprises a pair of closable jaws.

15. Apparatus according to claim 1 wherein said elastomer applying means comprises a roller mounted on one side of said endless belt to friction rubber into the adjacent surface of said cord assembly.

16. Apparatus according to claim 15 wherein said elastomer applying means comprises a pair of rollers mounted one on each side of said belt means.

17. Apparatus according to claim 1 including a press unit downstream of said elastomer applying means to consolidate said fabric assembly.

18. Apparatus according to claim 1 including a haul-off and batch unit downstream of said elastomer applying means.

19. Apparatus according to claim 1 wherein said guide means is constructed and arranged to lay said cord at an acute angle relative to the direction of movement of said belt.

* * * * *